2,877,152
Patented Mar. 10, 1959

2,877,152

PESTICIDAL PHOSPHORUS ESTERS

Joe R. Willard and John F. Henahan, Middleport, N. Y., assignors to Food Machinery and Chemical Corporation, New York, N. Y., a corporation of Delaware No Drawing. Application April 9, 1957
Serial No. 651,579

13 Claims. (Cl. 167—22)

The invention relates to new and useful derivatives of methylene bisdithiophosphates, and to pesticidal compositions containing the same.

The compounds of this invention have the general formula

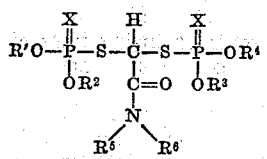

wherein $R'$, $R^2$, $R^3$ and $R^4$ are the same or different organic radicals, X is oxygen or sulfur, and $R^5$ and $R^6$ are organic radicals and may be part of a ring system. These bis-dithiophosphates have acaricidal, insecticidal, fungicidal and nematocidal properties. Although activity varies among different members of the class, in general these compounds are highly toxic towards a large variety of pests. In pesticidal compositions exhibiting most marked activity at low concentrations, those compounds wherein $R'$, $R^2$, $R^3$ and $R^4$ are lower alkyl radicals, and X is sulfur, are generally preferred.

The compounds of this invention may be prepared by reacting a N,N-disubstituted dihaloacetamide with a salt of the appropriate dialkyl phosphorothioic acid. The halogen atoms of the dihaloacetamide may both be the same, such as chlorine or bromine; or if it is desired to prepare, in a two-step reaction, a compound wherein $R^3$ and $R^4$ are different from $R'$ and $R^2$, the reaction may be facilitated by using, for example, a chlorobromoacetamide as reactant. In addition, mixtures of phosphorus diesters may be used to obtain a desired combination of radicals in the final product.

The N-substituents of the dihaloacetamide may be selected from a wide variety of organic rdaicals. Thus, $R^5$ and $R^6$ may each be an aliphatic radical, such as saturated or unsaturated alkyl, cycloalkyl, aralkyl and substituted derivatives thereof, including, for example, radicals such as methyl, ethyl, isopropyl, sec.-butyl, cyclohexyl, 2-ethylhexyl, n-octyl, benzyl, phenlethyl, carboxymethyl, pentamethylene, ethyleneoxyethylene, and the like. One or more of these substituents may also be aryl, such as phenyl or substituted phenyl, including such derivatives as chlorophenyl, nitrophenyl, methoxyphenyl, biphenyl and the like. Or $R^5$ and $R^6$ may be connected to form a heterocyclic ring. The N,N-disubstituted dihaloacetamides may be prepared by known methods; for example, by reacting a secondary amine with a dihaloacetyl chloride in the presence of a base such as triethyl amine to absorb hydrogen chloride formed during the reaction.

The dialkyl phosphorothioic or phosphorodithioic acid which is reacted with the dihaloacetamide is preferably used in the form of a salt, such as the alkali metal and alkaline earth salts and the ammonium and silver salts. The phosphorus acid diester itself may be prepared by methods known in the art. For instance, a diester of dithiophosphoric acid may be prepared by reacting an alcohol or a mixture of alcohols with phosphorus pentasulfide. Depending on the alcohols used, the esterifying groups may be any organic radical or mixtures thereof.

In the preferred process of this invention, two molar equivalents of the appropriate phosphorothioic or phosphorodithioic acid is dissolved in a solvent such as ethanol or dioxane, and a solution of the metal hydroxide is added until the pH is about seven. A 25–40% solution of potassium hydroxide in ethanol is a convenient reagent. A performed salt of the phosphorus acid may also be used, dissolved in a solvent. To the neutral solution is added one molar equivalent of the desired dihaloacetamide, and the mixture is heated until the reaction is complete. This generally requires about 4–14 hours under reflux. The product is then separated and tested for pesticidal activity.

This class of compounds is characterized by a broad scope of pesticidal activity, including insecticidal, fungicidal, acaricidal, ovicidal, and nematoicidal properties; in addition, some of these compounds show systemic activity. This unusually broad range of activity appears to be a general characteristic of this class of compounds, some of which of course show higher toxicity and greater specificity than others.

These compounds are made into pesticidal compositions by formula as aqueous emulsions, as dry or wettable powders, as solutions or in any other suitable vehicle. The compositions can be utilized as sprays, as dusts, as aerosol mixtures, as insecticidal coating compositions, and as residues. In general, they can be applied by methods commonly used for the control or eradication of insects, mites and the like. Thus, these compositions may be formulated with solvents, diluents, carrier media, adhesives, spreading, wetting and emulsifying agents and other ingredients. These compounds may be used as the sole toxic ingredient in pesticidal formulations, or in combination with other toxicants or synergists for specific applications.

The toxicants of this invention may be employed in controlling many types of pests, including insects, arachnids, nematodes and fungi, such as, for example, the German roach (*Blattela germanica* (L.)), Mexican bean beetle (*Epilachnia varivestis* (Muls.)), southern armyworm (*Prodenia eridania* (Cram.)), pea aphid (*Macrosiphum pisi* (Kltb.)), two-spotted spider mite (*Tetranychus bimaculatus* (H.)), bean rust (*Uromyces appendiculatus*), cucumber anthracnose (*Colletotrichum lagenarium*), early blight of tomato (*Alternaria solani*), late blight of tomato (*Phytophthora infestans*), the root-knot nematode (*Meloidogyne incognita*), and the like. Standard test methods are used for measuring the activity of these toxicants.

A typical formulation used to evaluate the toxicants of this invention is a wettable powder containing 25% of the candidate pesticide, 72% attaclay (fullers' earth) and 3% of an alkyl aryl polyether alcohol as wetting agent. In routine testing, this wettable powder is applied to plant foliage by applying as an aqueous dispersion, at a dilution of 1250 parts of toxicant per million parts of dispersion.

The following examples illustrate the preparation, properties and pesticidal behavior of typical compounds of this invention. All parts are by weight.

EXAMPLE 1

To an ethanolic solution of 37.2 parts of O,O-diethyl hydrogen phosphorodithioate was added 25% ethanolic potassium hydroxide slowly to a pH of 6.0–6.5, maintaining the temperature below 50° C. during the addition. To this solution of potassium O,O-diethylphosphorodithioate was added 15.6 parts of N,N-dimethyl dichloroacetamide. The mixture was heated under reflux for two hours. After filtering off the precipitated potassium chloride the filtered mixture was concentrated under reduced pressure. The residue was washed with water, the aqueous washes were extracted with ether, and the combined organic phases were dried over sodium sulfate. Removal of the ether from the dried solution yielded 32.6 parts (70% yield) of bis(S-(diethoxyphosphinothioyl) - mercapto)(N,N - dimethylcarbamyl)methane. This compound was opaque in the refractometer. Analysis: Calcd. for $C_{12}H_{27}NO_5P_2S_4$: P:13.60, S:28.16. Found: P:13.80, S:28.30.

This compound was formulated for pesticidal testing by preparing a wettable powder concentrate containing 25.0% of the compound, 3% of an alkyl aryl polyether and 72.0% attaclay (fullers' earth). At 1250 p. p. m. in aqueous emulsion, this compound exhibited 100% kill of the German roach, 100% kill of the two-spotted mite, 100% kill of the Mexican bean beetle, 50% kill of the southern armyworm and 100% kill of the pea aphid.

EXAMPLE 2

Additional compounds of this series may be prepared, following the method illustrated in Example 1. Tabulated below are the refractive indexes and yield data for various compounds prepared by reacting the appropriate N,N-disubstituted dihaloacetamide and dialkyl phosphorodithioate, and having the general formula:

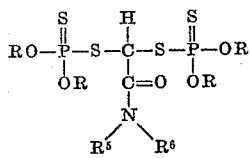

Table 1.—Bis(S - (dialkoxyphosphinothioyl)mercapto) acetamides

| Compound | | | Yield, Percent | $n_D^{25}$ |
|---|---|---|---|---|
| R | R⁵ | R⁶ | | |
| Methyl | Methyl | Methyl | 28 | 1.5070 |
| Ethyl | Ethyl | Ethyl | 74 | 1.5078 |
| Do | Isobutyl | Isobutyl | 73 | opaque liq. |
| Do | n-Octyl | n-Octyl | 75 | Do. |
| Do | Allyl | Allyl | 84 | 1.5090 |
| Do | Pentamethylene | | 83 | 1.5183 |
| Do | Ethyleneoxyethylene | | 72 | 1.5140 |
| Isopropyl | Methyl | Methyl | 81 | opaque liq. |
| Do | Ethyl | Ethyl | 63 | Do. |
| Do | Allyl | Allyl | 81 | Do. |
| n-Butyl | Ethyl | Ethyl | 84 | Do. |

These compounds were shown by tests to be pesticidal toxicants. In Table 2 below are listed the results of screening tests against insects and mites. A wettable powder formulation, diluted to 1250 p. p. m., is applied to plant foliage, the treated plants are infested, and observations made at intervals to determine the efficacy of the compounds as toxicants.

Table 2.—Initial contact insecticidal and acaricidal activity

| Compound | | | Percent Kill at 1,250 p. p. m. | | |
|---|---|---|---|---|---|
| R | R⁵ | R⁶ | Two-spotted Mite | Mexican Bean Beetle | Pea Aphid |
| Ethyl | Ethyl | Ethyl | 100 | 100 | 100 |
| Do | Allyl | Allyl | 100 | 100 | 100 |
| Do | Isobutyl | Isobutyl | 100 | 95 | 0 |
| Do | Ethyleneoxyethylene | | 100 | 100 | 100 |
| Do | Pentamethylene | | 100 | 100 | 85 |
| Isopropyl | Methyl | Methyl | 100 | 0 | 100 |

Fungicidal activity was evaluated by testing against four plant pathogens each of which is capable of producing a discreet lesion on a specific host plant. The candidate toxicant is applied to the host plant foliage as an aqueous emulsion of a wettable powder. The plants are allowed to dry and the appropriate pathogen is applied by spraying an aqueous suspension of the spores. The control obtained is determined by comparison of the number of lesions on the chemically treated plant with the number of lesions on plants which were inoculated without prior chemical treatment. In Table 3 below are presented results obtained when the candidate fungicide is applied at a dilution of 1250 p. p. m.

Table 3.—Fungicidal activity

| Compound | | | Percent control at 1,250 p. p. m. | | |
|---|---|---|---|---|---|
| R | R⁵ | R⁶ | Early blight | Late blight | Bean rust |
| Ethyl | Methyl | Methyl | 67 | 78 | 81 |
| Do | Allyl | Allyl | 71 | 68 | 62 |
| Do | Ethyl | Ethyl | 52 | 67 | 84 |
| Do | Ethyleneoxyethylene | | 71 | 58 | 62 |

Candidate nematocides were screened against the rootknot nematode, as follows: An inoculum consisting of finely chopped roots of highly infested tomato plants, and the chemical to be tested, are blended thoroughly with sufficient potting soil to give the desired concentration of chemical, as calculated in terms of pounds per acre. Young tomato plants are then potted in this soil, and the degree of rootknot infestation noted at the end of four weeks. Table 4 below presents results for representative compounds, expressed in terms of severity of infestation for two different concentrations of chemical toxicant. The rating 0 indicates no infestation, 1 indicates 1–25% infestation, 2 indicates 26–50 infestation and 3 indicates 51–75% infestation.

Table 4.—Nematocidal activity

| Compound | | | Severity of infestation | |
|---|---|---|---|---|
| R | R⁵ | R⁶ | 400 lb./acre | 200 lb./acre |
| Ethyl | Methyl | Methyl | 1 | 2 |
| Do | Ethyl | Ethyl | 0 | 1 |
| Do | Isobutyl | Isobutyl | 2 | 2 |
| Do | n-Octyl | n-Octyl | 2 | 3 |
| Do | Ethyleneoxyethylene | | | 1 |

This application is a continuation-in-part of copending application Serial No. 597,886, filed July 16, 1956.

The invention herein has been described with particular reference to specific embodiments. It is to be understood, however, that the invention is not to be limited to these embodiments, but is to be construed broadly and restricted solely by the scope of the appended claims.

That which is claimed is:

1. A compound of the formula:

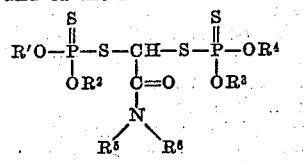

wherein R', R², R³, R⁴, R⁵ and R⁶ each represents a lower alkyl radical.

2. A compound of the formula:

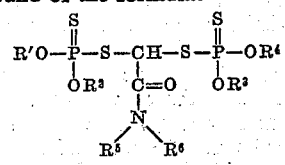

wherein R', R², R³ and R⁴ each represents an alkyl radical and R⁵ and R⁶ each represents a lower alkenyl radical.

3. Bis(S-(diethoxyphosphinothioyl)mercapto) - (N,N-di-methylcarbamyl)methane.

4. Bis(S-(diethoxyphosphinothioyl)mercapto) - (N,N-di-methylcarbamyl)methane.

5. Bis(S-(diethoxyphosphinothioyl)mercapto) - (N,N-allylcarbamyl)methane.

6. Bis(S - (di - 2 - propoxyphosphinothioyl)mercapto)-(N,N-diallycarbamyl)methane.

7. Bis(S - (di - 1 - butoxyphosphinothioyl)mercapto) (N,N-diethylcarbamyl)methane.

8. A compound of the formula:

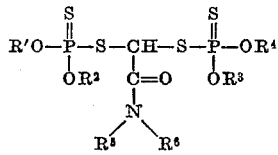

wherein $R'$ $R^2$, $R^3$, and $R^4$ each represents a lower alkyl radical and $R^5$ and $R^6$ each represents a radical selected from the group consisting of alkyl having from 1 to 8 carbon atoms, lower alkenyl, and 5 and 6 membered alkylene and alkyleneoxyalkylene rings.

9. A pesticidal composition comprising a toxic concentration of a compound of claim 8 and an inert pesticidal adjuvant therefor.

10. A pesticidal composition comprising a toxic concentration of a compound of claim 1 and an inert pesticidal adjuvant therefor.

11. A pesticidal composition comprising a toxic concentration of a compound of claim 2 and an inert pesticidal adjuvant therefor.

12. A method of destroying pests comprising contacting said pests with a compound of the formula

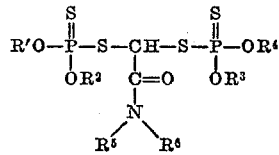

wherein $R'$, $R^2$, $R^3$ and $R^4$ each represents a lower alkyl radical and $R^5$ and $R^6$ each represents a radical selected from the group consisting of alkyl having from 1 to 8 carbon atoms, lower alkenyl and 5 and 6 membered alkylene and alkyleneoxyalkylene rings.

13. A method of destroying pests comprising contacting said pests with a compound of the formula

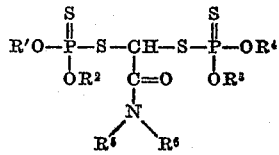

wherein $R'$, $R^2$, $R^3$, $R^4$, $R^5$ and $R^6$ each represents a lower alkyl radical.

No references cited.

UNITED STATES PATENT OFFICE
CERTIFICATE OF CORRECTION

Patent No. 2,877,152                              March 10, 1959

Joe R. Willard et al.

It is hereby certified that error appears in the printed specification of the above numbered patent requiring correction and that the said Letters Patent should read as corrected below.

Column 1, line 50, for "rdaicals" read -- radicals --; column 2, line 11, for "performed" read -- preformed --; line 27, for "formula" read -- formulation --; column 5, line 4, for "-methylcarbamyl)" read -- -ethylcarbamyl) --; line 6, for "allylcarbamyl)" read -- diallylcarbamyl) --.

Signed and sealed this 28th day of July 1959.

(SEAL)

Attest:

KARL H. AXLINE
Attesting Officer

ROBERT C. WATSON
Commissioner of Patents